United States Patent
Kim et al.

(10) Patent No.: US 8,678,361 B2
(45) Date of Patent: Mar. 25, 2014

(54) REBOUND STOPPER OF STRUT ASSEMBLY FOR SUSPENSION IN VEHICLE

(75) Inventors: Jae Hun Kim, Hwaseong-si (KR); Se Il Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 148 days.

(21) Appl. No.: 13/302,784

(22) Filed: Nov. 22, 2011

(65) Prior Publication Data

US 2012/0261868 A1   Oct. 18, 2012

(30) Foreign Application Priority Data

Apr. 12, 2011 (KR) .................. 10-2011-0033602

(51) Int. Cl.
*F16F 7/104* (2006.01)
*F16F 13/22* (2006.01)
*F16F 15/08* (2006.01)

(52) U.S. Cl.
USPC ........................ 267/195; 267/220; 188/380

(58) Field of Classification Search
USPC ......... 267/195, 216–217, 219–220, 139–140; 188/378–380, 321.11
See application file for complete search history.

(56) References Cited

U.S. PATENT DOCUMENTS

| | | | | |
|---|---|---|---|---|
| 5,788,262 | A * | 8/1998 | Dazy et al. | 280/124.155 |
| 6,352,250 | B1 * | 3/2002 | Tsuruta et al. | 267/220 |
| 7,290,644 | B2 * | 11/2007 | Miyake | 188/379 |
| 2011/0133379 | A1 * | 6/2011 | Viault et al. | 267/217 |

FOREIGN PATENT DOCUMENTS

| | | | | |
|---|---|---|---|---|
| JP | | 02068212 A | * | 3/1990 |
| WO | WO | 2010012766 A1 | * | 2/2010 |

* cited by examiner

*Primary Examiner* — Anna Momper
(74) *Attorney, Agent, or Firm* — Morgan, Lewis & Bockius LLP

(57) ABSTRACT

A rebound stopper of a strut assembly for a suspension in a vehicle, may include a steel plate combined with a strut and being fitted over an upper end of the strut which has passed into a car body, a rubber plate fitted around an outer circumferential edge of the steel plate, and a mass damper combined with the rubber plate and functioning as a damper by resiliently moving relative to the rubber plate during a rebounding motion of the strut assembly.

6 Claims, 5 Drawing Sheets

REBOUND STOPPER OF STRUT ASSEMBLY FOR SUSPENSION IN VEHICLE

CROSS-REFERENCE TO RELATED APPLICATIONS

The present application claims priority to Korean Patent Application No. 10-2011-0033602 filed on Apr. 12, 2011, the entire contents of which is incorporated herein for purposes by this reference.

BACKGROUND OF THE INVENTION

1. Field of the Invention

The present invention relates, in general, to a rebound stopper of a strut assembly for a suspension in a vehicle and, more particularly, to a rebound stopper of a strut assembly for a suspension in a vehicle which can reduce the noise and vibrations applied from the tires to the car body, thereby improving the NVH (Noise, Vibration and Harshness) performance of the vehicle.

2. Description of Related Art

Generally, as shown in FIGS. 1 through 3, a strut assembly of a suspension provided in a vehicle, which functions to reduce the shocks and vibrations applied from a road to a car body and realizes a comfortable feeling when riding the vehicle, includes a strut 1, which connects a wheel knuckle to the car body, and a coil spring 7, which surrounds the strut 1 and is supported at opposite ends both by a lower spring seat 3 and by an upper spring seat 5 mounted to the strut 1.

Further, a range spanning between the lower spring seat 3 and the upper spring seat 5 of the strut 1 is covered with a dust cover 9. The strut assembly further includes a bump stopper 11, a bearing 13 and an insulator 15, which are fitted over the strut 1 at a location inside the upper end of the dust cover 9, at a location on the upper spring seat 5, and at a location on the bearing 13, respectively.

The insulator 15 is held on the strut 1 by a lower nut 17. The upper end of the strut 1, which has the insulator 15, passes into the car body 19, with a rebound stopper 30 being assembled with the upper end of the strut 1 inside the car body 19 and being tightened by an upper nut 21.

Here, when the upper end of the strut 1 is mounted to the car body 19 after passing into the car body 19, the insulator 15 comes into contact with an outer surface of the car body 19.

Further, the rebound stopper 30 includes a steel plate 31 which is fitted over the strut 1 at a location between the lower nut 17 and the upper nut 21, and a rubber plate 33 fitted around the outer circumferential edge of the steel plate 31. When the strut assembly rebounds, the steel plate 31 helps maintain the strength of the rebound stopper 30 and the rubber plate 33 prevents the steel plate 31 from coming into direct contact with the car body 19 and functions as a cushion.

The strut assembly having the above-mentioned construction reduces a load from a tire using both the strut 1 and the coil spring 7. When a low load is applied from the tire, the strut assembly can absorb shocks and vibrations almost completely, thus efficiently intercepting the load which may be transmitted to the car body 19. However, when a high load is applied from the tire, the strut assembly cannot completely absorb shocks and vibrations so that remaining shocks and vibrations may be transmitted to the car body 19, thereby generating noise and vibrations in the car body 19.

When the rebound stopper 30 functions as a damper capable of absorbing the shocks and vibrations, the strut assembly can more efficiently reduce the shocks and vibrations transmitted to the car body 19. However, in the conventional strut assembly, the rebound stopper 30 includes the steel plate 31 for helping maintain the strength of the rebound stopper 30 and the rubber plate 33 for functioning as a cushion, so that the rebound stopper 30 may fail to function as a damper.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rebound stopper of a strut assembly for a suspension in a vehicle, which has a function of a damper and more efficiently reduces shocks and vibrations applied from a tire, thereby minimizing the transmission of the shocks and vibrations to a car body and remarkably reducing noise generated in the car body, and improving the NVH (Noise, Vibration and Harshness) performance of a vehicle.

In an aspect of the present invention, the rebound stopper of a strut assembly for a suspension in a vehicle, may include a steel plate combined with a strut and being fitted over an upper end of the strut which may have passed into a car body, a rubber plate fitted around an outer circumferential edge of the steel plate, and a mass damper combined with the rubber plate and functioning as a damper by resiliently moving relative to the rubber plate during a rebounding motion of the strut assembly.

The mass damper may be combined with the rubber plate at a location above the rubber plate with a predetermined distance.

The rubber plate may be provided with a plurality of rubber protrusions, which integrally extend upwards from an upper surface of the rubber plate, and the mass damper may be provided with a plurality of protrusion fitting holes for receiving the respective rubber protrusions therethrough, wherein when the mass damper may be combined with the rubber plate by being fitted over the rubber protrusions, an upper surface of the rubber plate may be spaced apart from a lower surface of the mass damper with a predetermined distance in such a manner that during a rebounding motion of the strut assembly, the rubber protrusions function as springs due to a motion of the mass damper.

In another aspect of the present invention, the mass damper may be an annular plate having a predeteimined thickness.

The rubber protrusions may be provided on an upper circumferential surface of the rubber plate at locations spaced apart from each other at predetermined intervals.

The mass damper may be made of steel.

The rubber plate may be fitted around the outer circumferential edge of the steel plate in such a way that the rubber plate covers upper and lower surfaces of the outer circumferential edge of the steel plate.

The rebound stopper of the strut assembly according to the present invention is advantageous in that the mass damper can further reduce a load applied from a tire when driving a vehicle, thus minimizing the transmission of load to a car body and remarkably reducing the noise and vibrations generated by the car body, thereby improving the NVH performance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
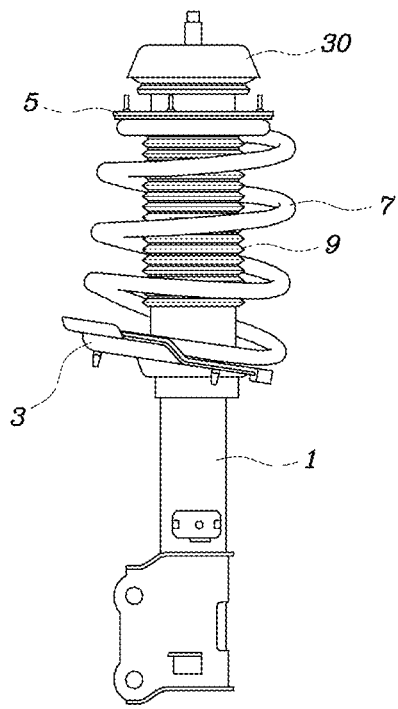
FIG. 1 is a front view of a strut assembly for a suspension of a conventional rebound stopper.
Figure 2:
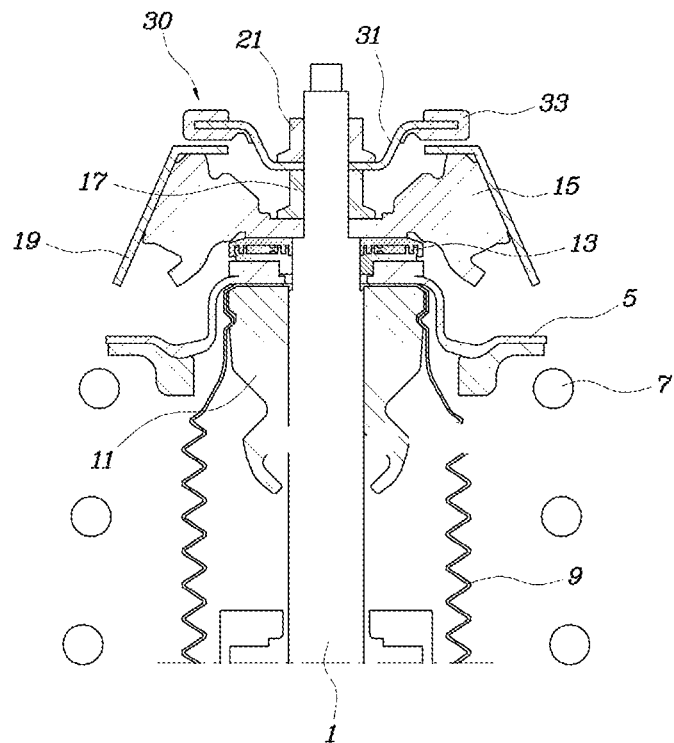
FIG. 2 is a sectional view of a strut assembly and illustrates the construction of a conventional rebound stopper.
Figure 3:
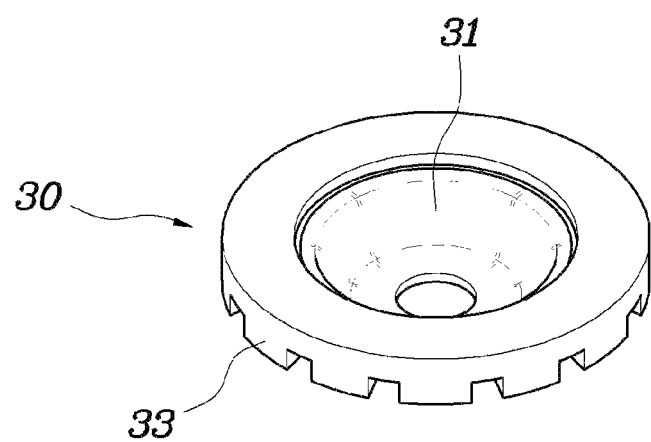
FIG. 3 is a perspective view of the conventional rebound stopper.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the invention with reference to the accompanying drawings.

Figure 4:
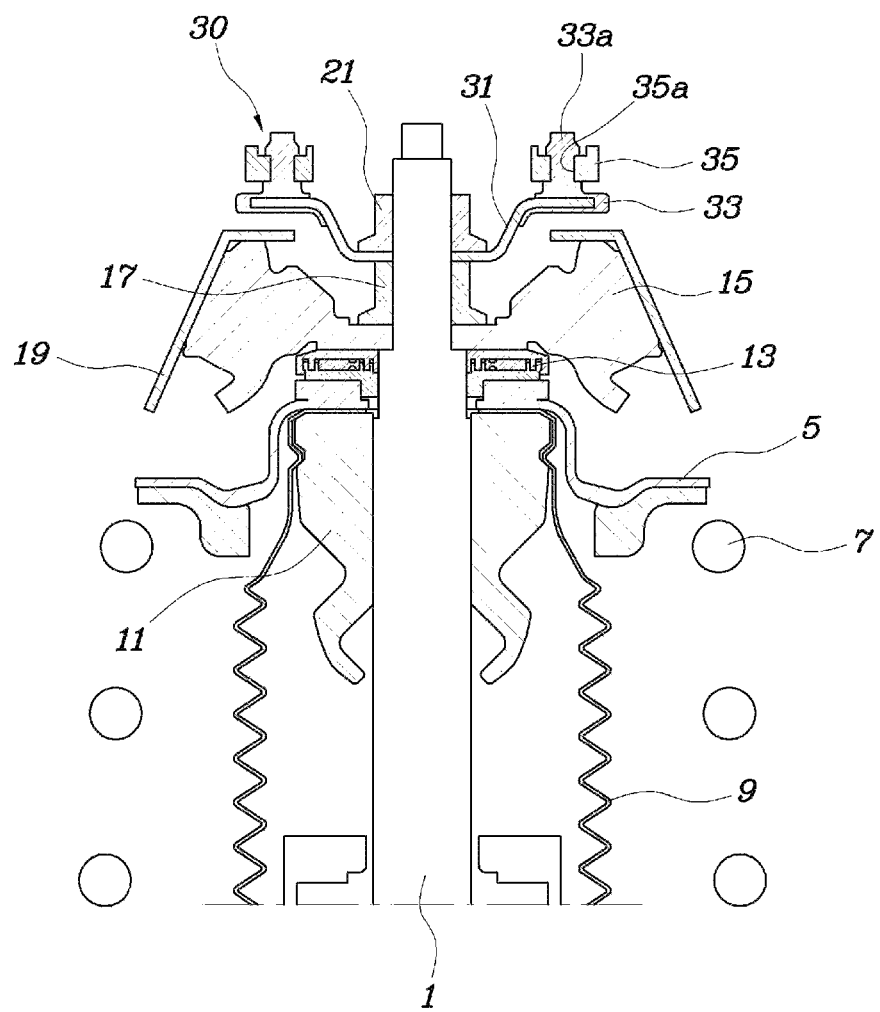
FIG. 4 is a sectional view of a strut assembly and illustrates the construction of a rebound stopper according to an exemplary embodiment of the present invention.

As shown in FIGS. 1 and 4, a strut assembly constituting a suspension of a vehicle includes a strut 1, which connects a wheel knuckle to a car body, and a coil spring 7, which surrounds the strut 1 and is held at opposite ends both by a lower spring seat 3 and by an upper spring seat 5 mounted to the strut 1.

Further, a range spanning between the lower spring seat 3 and the upper spring seat 5 of the strut 1 is covered with a dust cover 9. The strut assembly further includes a bump stopper 11, a bearing 13 and an insulator 15, which are fitted over the strut 1 at a location inside the upper end of the dust cover 9, at a location on the upper spring seat 5, and at a location on the bearing 13, respectively.

The insulator 15 is held on the strut 1 by a lower nut 17. The upper end of the strut 1, which has the insulator 15, passes into the car body 19, with a rebound stopper 30 being assembled with the upper end of the strut 1 inside the car body 19 and being tightened by an upper nut 21.

Here, when the upper end of the strut 1 is mounted to the car body 19 after passing into the car body 19, the insulator 15 comes into contact with an outer surface of the car body 19.

Figure 5:
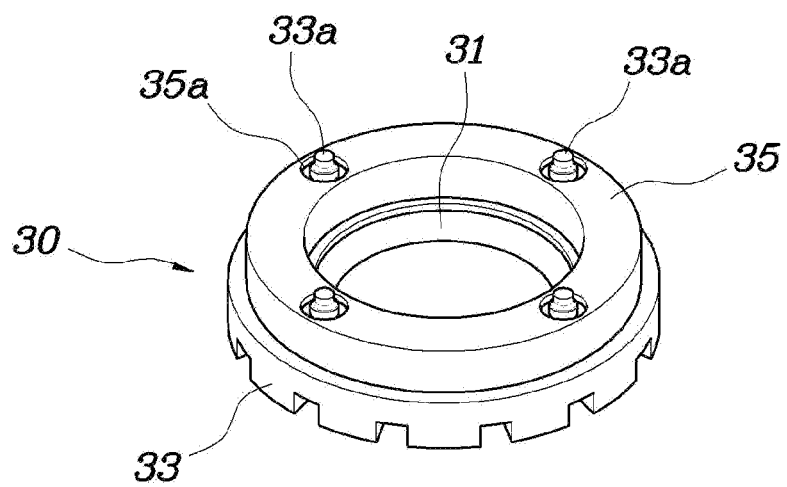
FIG. 5 is a perspective view of the rebound stopper according to an exemplary embodiment of the present invention.

Further, as shown in FIG. 5, the rebound stopper 30 according to an exemplary embodiment of the present invention includes a steel plate 31 which is fitted over the strut 1 at a location between the lower nut 17 and the upper nut 21, a rubber plate 33 which is fitted around the outer circumferential edge of the steel plate 31, and a mass damper 35 which is combined with the rubber plate 33 in such a way that the mass damper 35 can resiliently move relative to the rubber plate 33 during a rebounding motion of the strut assembly, thus functioning as a damper.

Here, when the strut assembly rebounds, the steel plate 31 keeps up the strength of the rebound stopper 30 and the rubber plate 33 prevents the steel plate 31 from coming into direct contact with the car body 19 and functions as a cushion. Further, in the above state, the mass damper 35 functions to attenuate the shocks and vibrations applied from a tire.

The mass damper 35 is combined with the rubber plate 33 at a location on the rubber plate 33 so that the mass damper 35 can be more stably combined with the rubber plate 33 and can more effectively realize the function of a damper.

To achieve this object, a plurality of rubber protrusions 33a integrally extends upwards from the upper surface of the rubber plate 33, while the mass damper 35 is provided with a plurality of protrusion fitting holes 35a for receiving the respective rubber protrusions 33a.

Therefore, the mass damper 35 is combined with the rubber plate 33 by being fitted over the rubber protrusions 33a at a location on the upper surface of the rubber plate 33.

Further, when the mass damper 35 is combined with the rubber plate 33 by being fitted over the rubber protrusions 33a, the upper surface of the rubber plate 33 is spaced apart from the lower surface of the mass damper 35, so that when the strut assembly makes a rebounding motion, the rubber protrusions 33a can function as springs due to a motion of the mass damper 35. When the rubber protrusions 33a function as springs as described above, the mass damper 35 can more effectively execute the function of a damper and can effectively attenuate the shocks and vibrations applied from a tire.

In an exemplary embodiment of the present invention, the mass damper 35 is an annular plate having a predetermined thickness and preferably made of steel. The shape of the mass damper 35 may be variously changed as desired, but the material of the mass damper 35 preferably uses steel having a predetermined specific weight.

Further, the rubber protrusions 33a may be formed on the upper circumferential surface of the rubber plate 33 at locations spaced apart from each other at regular intervals. This allows the mass damper 35 to evenly impart the load over all of the rubber protrusions 33a, so that the mass damper 35 can effectively function as a damper and the rubber protrusions 33a can effectively function as springs.

Further, the rubber plate 33 is fitted around the outer circumferential edge of the steel plate 31 in such a way that the rubber plate 33 covers the upper and lower surfaces of the outer circumferential edge of the steel plate 31. Therefore, the rubber plate 33 can be stably combined with the steel plate 31.

When a low load is applied from a tire to the strut assembly while driving the vehicle, the strut 1 and the coil spring 7 execute respective shock absorbing functions and effectively attenuate the shocks and vibrations caused by the load, thereby minimizing the transmission of the load to the car body 19.

However, when a high load is applied from the tire to the strut assembly while driving the vehicle, the strut 1 and the coil spring 7 primarily attenuate the shocks and vibrations caused by the load, and the mass damper 35 secondarily attenuates the shocks and vibrations, thereby minimizing the transmission of the load to the car body 19.

In other words, when the strut assembly executes a rebounding motion, the mass damper 35 can remarkably reduce the input load while functioning as a damper, so that the load which may be transmitted to the car body 19 by way of the insulator 15 can be remarkably reduced, thereby remarkably reducing the vibrations and noise generated in the car body 19 and remarkably improving the NVH performance of the vehicle.

In an exemplary embodiment of the present invention, even when a low load is applied to the strut assembly, the mass damper 35 can effectively function as a damper.

Figure 6:
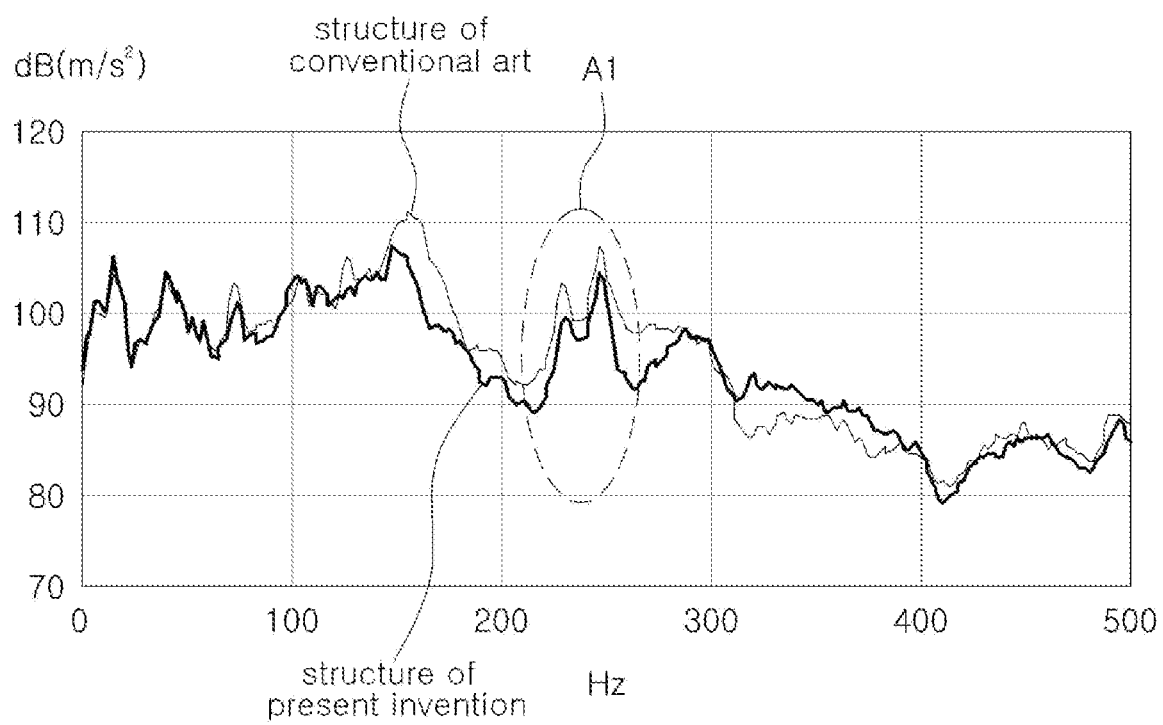
FIGS. 6 and 7 are diagrammatic views respectively showing the levels of vibrations and noise generated in a car body having the rebound stopper according to an exemplary embodiment of the present invention compared to the conventional structure.

FIG. 6 is a diagrammatic view showing the level of vibrations generated in the car body 19 in response to an input load applied from a tire to the strut assembly. As shown in the graph of FIG. 6, the region in which the maximum vibration is generated in response to the input load is the 230 Hz region A1. When reviewing the test results of the 230 Hz region A1, it is noted that the structure according to an exemplary embodiment of the present invention can reduce the vibrations caused by the input load by about 2 dB~3 dB compared to a conventional structure.

Figure 7:
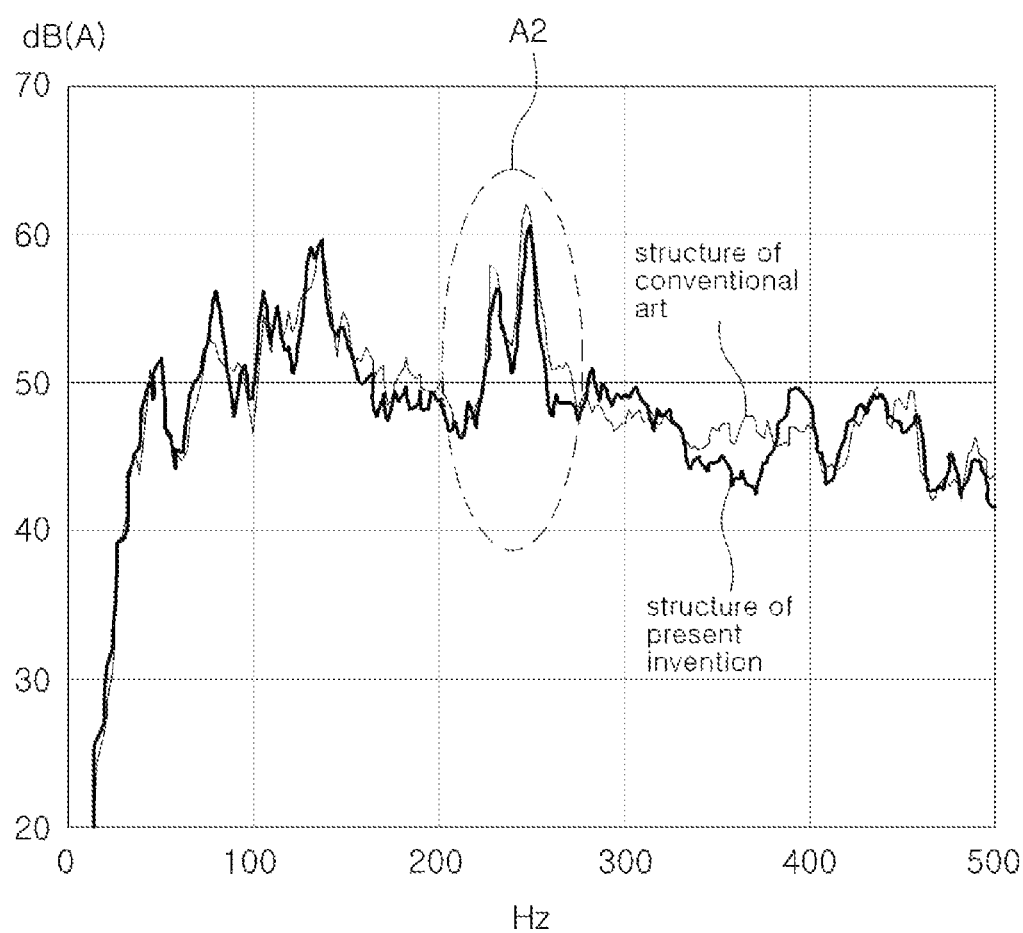

Further, FIG. 7 is a diagrammatic view showing the level of noise generated in the car body 19 in response to an input load applied from a tire to the strut assembly. As shown in the graph of FIG. 7, the region in which the maximum noise is generated in response to the input load is the 220 Hz~240 Hz region A2. When reviewing the test results of the 220 Hz~240 Hz region A2, it is noted that the structure according to an exemplary embodiment of the present invention can reduce the noise caused by the input load by about 2 dB~3 dB compared to a conventional structure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rebound stopper of a strut assembly for a suspension in a vehicle, comprising:
    a steel plate combined with a strut and being fitted over an upper end of the strut which has passed into a car body;
    a rubber plate fitted around an outer circumferential edge of the steel plate in such a way that the rubber plate covers upper and lower surfaces of the outer circumferential edge of the steel plate, wherein the rubber plate is provided with a plurality of rubber protrusions, which integrally extend upwards from an upper surface of the rubber plate; and
    a mass damper combined with the rubber plate and functioning as a damper by resiliently moving relative to the rubber plate during a rebounding motion of the strut assembly, wherein the mass damper is provided with a plurality of protrusion fitting holes for receiving the respective rubber protrusions therethrough.

2. The rebound stopper as set forth in claim 1, wherein the mass damper is combined with the rubber plate at a location above the rubber plate with a predetermined distance.

3. The rebound stopper as set forth in claim 1, wherein when the mass damper is combined with the rubber plate by being fitted over the rubber protrusions, the upper surface of the rubber plate is spaced apart from a lower surface of the mass damper with a predetermined distance in such a manner that during a rebounding motion of the strut assembly, the rubber protrusions function as springs due to a motion of the mass damper.

4. The rebound stopper as set forth in claim 1, wherein the mass damper is an annular plate having a predetermined thickness.

5. The rebound stopper as set forth in claim 1, wherein the rubber protrusions are provided on an upper circumferential surface of the rubber plate at locations spaced apart from each other at predetermined intervals.

6. The rebound stopper as set forth in claim 1, wherein the mass damper is made of steel.

* * * * *